United States Patent
Horvitz et al.

(10) Patent No.: US 9,423,876 B2
(45) Date of Patent: Aug. 23, 2016

(54) OMNI-SPATIAL GESTURE INPUT

(75) Inventors: Eric Horvitz, Kirkland, WA (US);
Kenneth P Hinckley, Redmond, WA (US); Hrvoje Benko, Seattle, WA (US);
Desney S Tan, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1024 days.

(21) Appl. No.: 13/250,532

(22) Filed: Sep. 30, 2011

(65) Prior Publication Data

US 2013/0082978 A1    Apr. 4, 2013

(51) Int. Cl.
*G06F 3/01* (2006.01)
*G06F 3/0346* (2013.01)

(52) U.S. Cl.
CPC .............. *G06F 3/017* (2013.01); *G06F 3/0346* (2013.01); *G06F 2203/0381* (2013.01)

(58) Field of Classification Search
CPC  G06F 3/017; G06F 3/0346; G06F 2203/0381
USPC .................................. 345/156–184
See application file for complete search history.

(56) References Cited

U.S. PATENT DOCUMENTS

| 7,091,926 | B2 | 8/2006 | Kulas |
| 7,453,418 | B2 | 11/2008 | Palmquist |
| 7,725,547 | B2 | 5/2010 | Albertson et al. |
| 7,877,707 | B2 | 1/2011 | Westerman et al. |
| 2006/0227129 | A1 | 10/2006 | Peng |
| 2009/0244092 | A1* | 10/2009 | Hotelling ...................... 345/619 |
| 2009/0256809 | A1* | 10/2009 | Minor ........................... 345/173 |
| 2009/0309765 | A1 | 12/2009 | Wang et al. |
| 2009/0315834 | A1 | 12/2009 | Nurmi et al. |
| 2010/0053151 | A1 | 3/2010 | Marti et al. |

(Continued)

FOREIGN PATENT DOCUMENTS

| CN | 102159419 | 8/2011 |
| CN | 102200830 | 9/2011 |

(Continued)

OTHER PUBLICATIONS

Hwang, et al., "Design of the 3D Input Method based on Touch Device for Mobile", In proceedings of the 2009 Fifth International Joint Conference on INC, IMS and IDC, Aug. 25-27, 2009, 4 pages.
Apocalypso, "Beyond Multi-Touch Nokia Patents 3D Touchless Control Interface", Retrieved on: May 9, 2011, Available at: http://www.symbian-freak.com/news/008/01/touchless_device_patent_from_nokia.htm.
Notification of Transmittal of the International Search Report and the Written Opinion of the International Searching Authority, or the Declaration mailed Dec. 14, 2012, 10 pages.

(Continued)

*Primary Examiner* — Dmitriy Bolotin
(74) *Attorney, Agent, or Firm* — Micah Goldsmith; Judy Yee; Micky Minhas

(57) ABSTRACT

Embodiments of the present invention relate to systems, methods and computer storage media for detecting user input in an extended interaction space of a device, such as a handheld device. The method and system allow for utilizing a first sensor of the device sensing in a positive z-axis space of the device to detect a first input, such as a user's non-device-contacting gesture. The method and system also contemplate utilizing a second sensor of the device sensing in a negative z-axis space of the device to detect a second input. Additionally, the method and system contemplate updating a user interface presented on a display in response to detecting the first input by the first sensor in the positive z-axis space and detecting the second input by the second sensor in the negative z-axis space.

20 Claims, 10 Drawing Sheets

(56) References Cited

U.S. PATENT DOCUMENTS

| | | | |
|---|---|---|---|
| 2010/0095206 A1* | 4/2010 | Kim | 715/702 |
| 2010/0109577 A1 | 5/2010 | Loughrey | |
| 2010/0188328 A1 | 7/2010 | Dodge et al. | |
| 2010/0188353 A1* | 7/2010 | Yoon et al. | 345/173 |
| 2010/0277420 A1* | 11/2010 | Charlier et al. | 345/173 |
| 2010/0295772 A1 | 11/2010 | Alameh et al. | |
| 2011/0069021 A1* | 3/2011 | Hill | 345/173 |
| 2011/0164029 A1* | 7/2011 | King et al. | 345/419 |
| 2012/0044249 A1* | 2/2012 | Mashitani et al. | 345/419 |
| 2012/0242793 A1* | 9/2012 | Im et al. | 348/46 |
| 2012/0268410 A1* | 10/2012 | King et al. | 345/173 |

FOREIGN PATENT DOCUMENTS

| | | |
|---|---|---|
| EP | 2211530 A1 | 7/2010 |
| KR | 20100109577 | 6/2011 |

OTHER PUBLICATIONS

"Supplementary Search Report Issued in European Patent Application No. 12836253.0", Mailed Date: May 21, 2015, 3 Pages.

Chinese Office Action dated Dec. 31, 2014 with Search Report dated Dec. 16, 2014 in Application No. 20120367249.7, 14 pages.

* cited by examiner

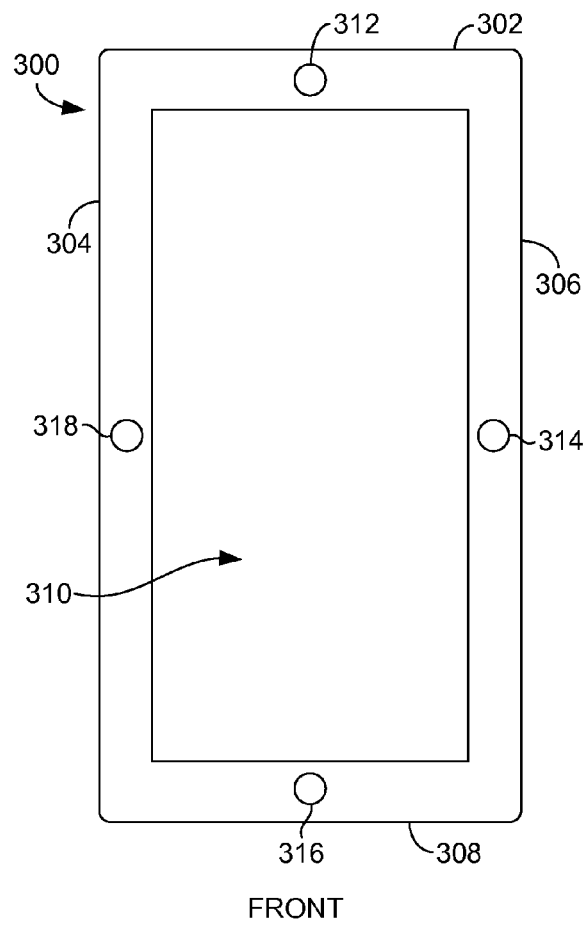
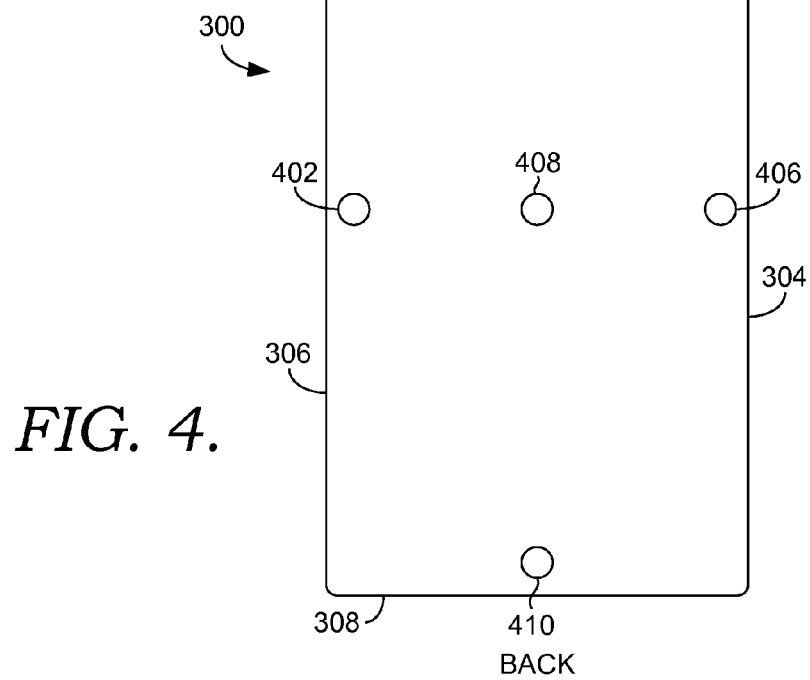
FIG. 3.
FIG. 4.

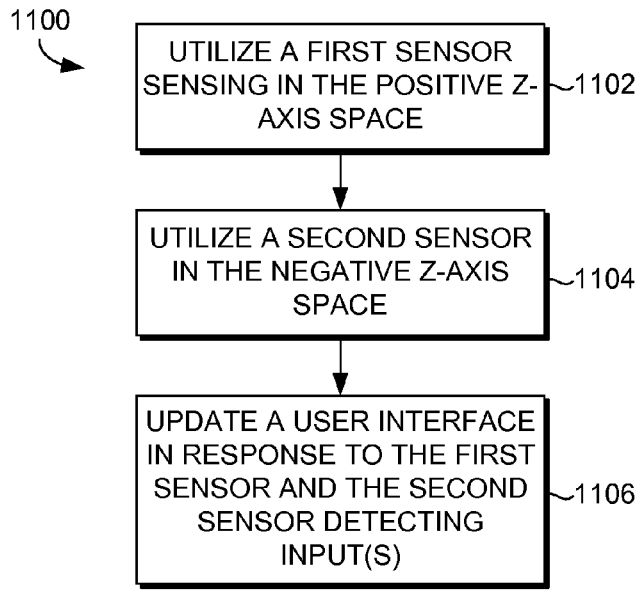
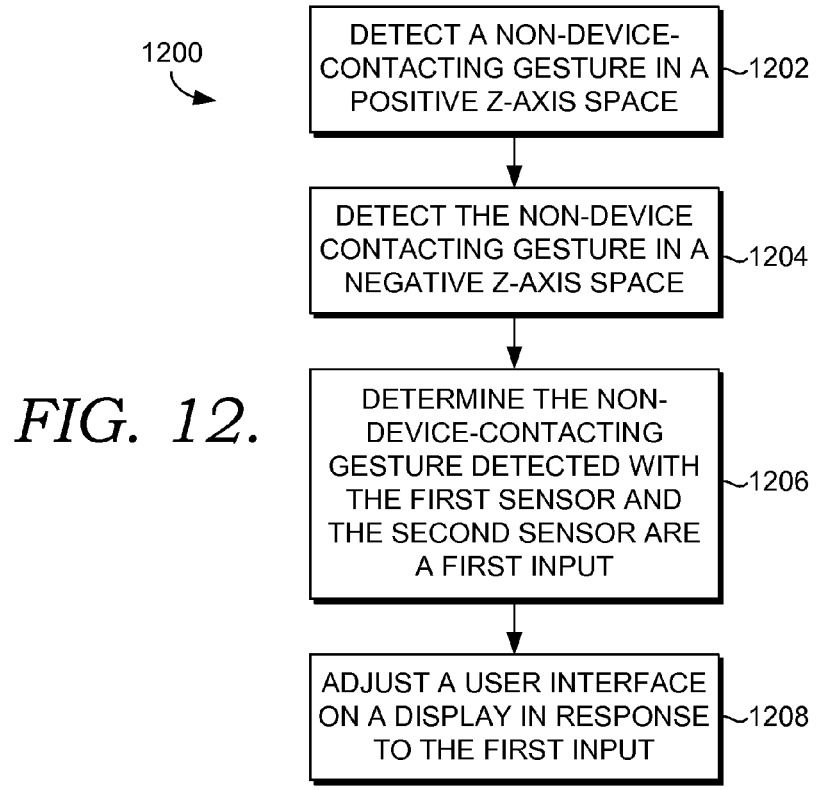
FIG. 11.
FIG. 12.

OMNI-SPATIAL GESTURE INPUT

BACKGROUND

Traditionally, a user interacts with a handheld device in a limited volume of space, usually on a display surface of the device. For example, a smart phone with a touch-sensitive display allows a user to interact with the device and the user interface in the volume of space immediately adjacent to the display screen. Limiting user interaction to an almost planar area that is between a user interface and the user limits the types of interactions available to the user and may introduce usability problems, such as occlusion of the user interface. Additionally, limiting an area of user interaction to a relatively two-dimensional scope prevents the user from manipulating objects presented in the user interface in a natural and intuitive manner.

SUMMARY

Embodiments of the present invention relate to systems, methods, and computer storage media for detecting user gestures in a space surrounding a device. In particular, aspects may include detecting a user gesture in front of a handheld device with a first sensor and also detecting a user gesture in the back of the handheld device with a second sensor. As a result of detecting the gestures, which may be non-device-contacting gestures, a user interface may be updated to reflect an input based on the gestures.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 3 depicts a front perspective of a device in accordance with embodiments of present invention;

FIG. 4 depicts a rear perspective of the device discussed with FIG. 2, in accordance with embodiments of the present invention;

FIG. 11 illustrates a block diagram depicting a method for detecting user input in both a positive z-axis space and a negative z-axis space of a device, in accordance with embodiments of the present invention; and FIG. 12 illustrates a block diagram depicting an additional method for detecting user input in both a positive z-axis space and a negative z-axis space of a device, in accordance with embodiments of the present invention.

DETAILED DESCRIPTION

Figure 1:
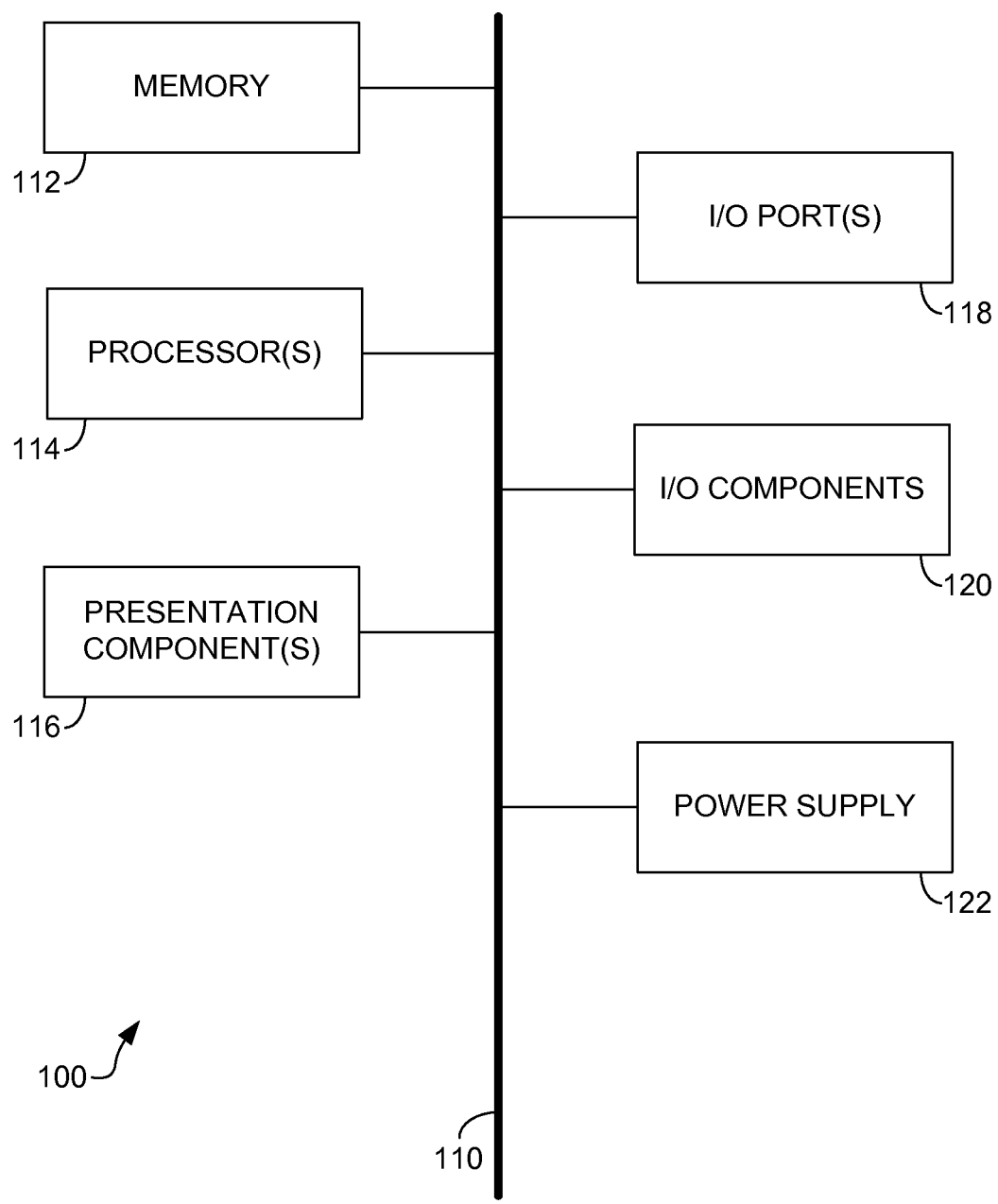
FIG. 1 depicts an exemplary computing system suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods, and computer storage media for detecting user gestures in a space beyond a physical device to include an area surrounding, but not always contacting, the device. For example, aspects may include detecting a user gesture in front of a handheld device with a first sensor and also detecting a user gesture in the back of the handheld device with a second sensor. As a result of detecting the gestures, which may be non-device-contacting gestures, a user interface may be updated to reflect an input based on the gestures.

Accordingly, in one aspect, the present invention provides a method in a computing environment utilizing a processor and memory for detecting user input in both a positive z-axis space and a negative z-axis space of a device. The method includes utilizing a first sensor of the device sensing in the positive z-axis space of the device to detect a first input. The first input is a non-device-contacting gesture. The method also includes utilizing a second sensor of the device sensing in the negative z-axis space of the device to detect a second input. Further, the method includes updating a user interface presented on the display in response to detecting the first input by the first sensor in the positive z-axis space and detecting the second input by the second sensor in the negative z-axis space.

In another aspect, the present invention provides a device for detecting user input in both a positive z-axis space and a negative z-axis space of the device. The device is comprised of a device body having a front side and an opposite back side. The front side is oriented toward the positive z-axis space and the back side is oriented toward the negative z-axis space. The device is also comprised of a first sensor coupled with the device body for sensing a non-device-contacting user gesture in the positive z-axis space of the device. Coupling of the sensor may include integrating the sensor into one or more portions of the device (e.g., the display). The device is further comprised of a second sensor coupled with the device body for sensing the non-device-contacting user gesture in the negative z-axis space of the device. Additionally, the device is comprised of a processor coupled with the device body for processing a first input from the first sensor sensing the non-device-contacting user gesture in the positive z-axis space of the device and for processing a second input from the second sensor sensing the non-device-contacting user gesture in the negative z-axis space of the device. The processor may be indirectly coupled with the body such that by being integrated into a circuit board or other component of the device, the processor is effectively coupled with the device body.

A third aspect of the present invention provides computer storage media having computer-executable instructions embodied thereon, that when executed by a computing system having a processor and memory, cause the computing system to perform a method. The method is comprised of detecting a non-device-contacting user gesture in a positive z-axis space of the device utilizing a first optical-based sensor. The method is further comprised of detecting the non-device-contacting user gesture in a negative z-axis space of the device utilizing a second optical-based sensor. The method is additionally comprised of determining, with a processor, the non-device-contacting user gesture detected with the first sensor in the positive z-axis space and the non-device-contacting user gesture detected with the second sensor in the negative z-axis space are a first input. The method is also comprised of adjusting a user interface on a display in response to determining the non-device-contacting gesture in the positive z-axis space and in the negative z-axis space is the first input.

Consequently, aspects of the present invention contemplated detecting the interactions of a user (e.g., non-contacting gestures) in a volume of space surrounding the device. For example, a spherical area extending from the device outwards may define the space in which a user may interact with the device, but yet interact beyond the device. As will be discussed hereinafter, the space surrounding a device may be defined, at least in part, as extending in both a positive and a negative direction from a point, such as a point within/on the device. As such, some aspects provided herein refer to sensing an interaction in a positive space and a negative space (e.g., positive z-axis and a negative z-axis), which encompasses the concept of detecting interactions with device in a volume of space surrounding the device.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes non-transitory computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
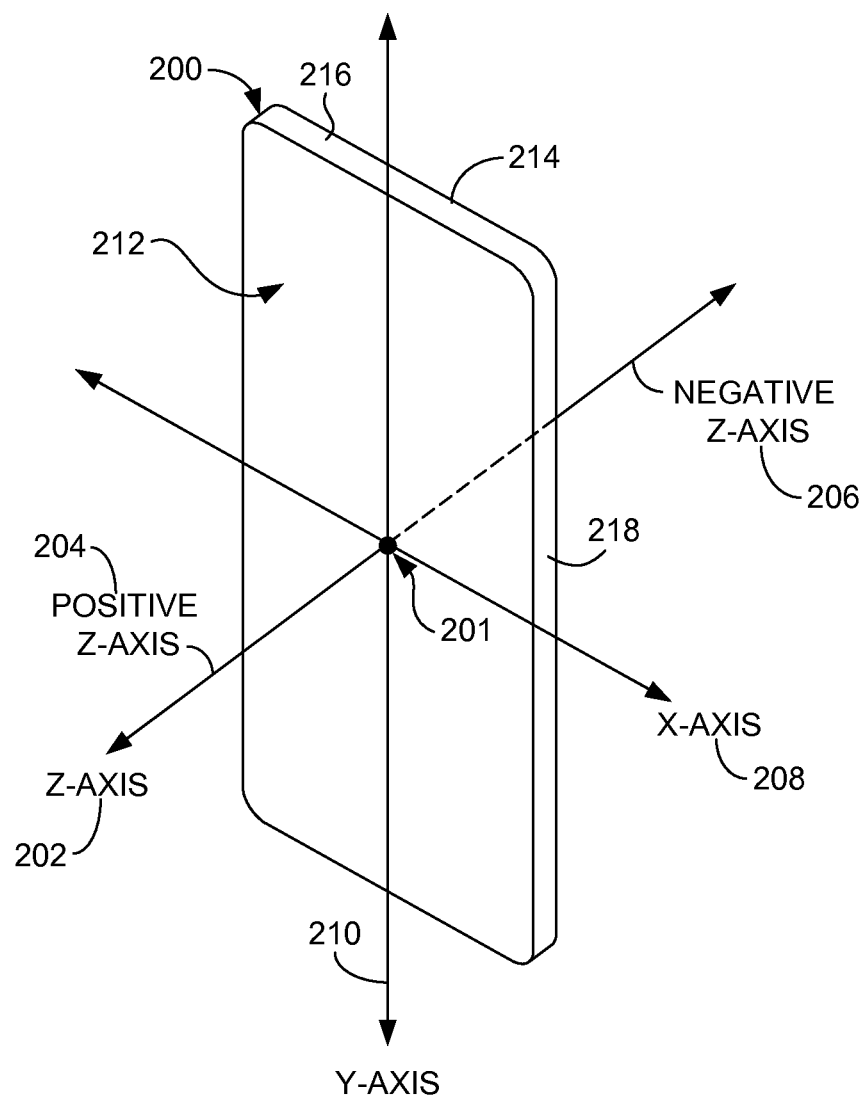
FIG. 2 depicts an exemplary device capable of sensing an input in both a positive z-axis space and a negative z-axis space relative to the device, in accordance with embodiments of the present invention.

FIG. 2 depicts an exemplary device 200 capable of sensing an input around the device in both a positive z-axis space and a negative z-axis space, in accordance with embodiments of the present invention. The device 200, in an exemplary embodiment, is a hand-held device, such as a mobile phone, a controller, a game device, and/or other electronic devices. For example, it is contemplated that the device 200 is a mobile communications device capable of communicating, at least in part, utilizing a wireless communications network (e.g., Wi-Fi, CDMA, GSM, PCS, and UMTS). Additionally, it is contemplated that the device 200, in an exemplary embodiment, is an input device for one or more additional computing devices (e.g., video game console, personal computer, set-top box, another hand-held device). Therefore, the device 200 may be any computing device (such as that discussed above with respect to FIG. 1) that may utilize detectable inputs in both the positive z-axis space and in the negative z-axis space.

The device 200 of FIG. 2 depicts exemplary Cartesian axes useable for defining a volume of space relative to the device 200. In particular, an x-axis 208, a y-axis 210 and a z-axis 202 are depicted relative to the device 200. However, as will be discussed herein, it is contemplated that an axis (e.g., z-axis) may be positioned at any location and at any orientation relative to the device to allow for the detection of gestures in any space around the device. Therefore, it is contemplated that a gesture input may be detected in 360 degrees of any (and all) plane, resulting in an omni-spatial gesture detection about the device. The device 200, as depicted in FIG. 2, has a vertical side 218, which is substantially parallel with the y-axis 210. The device 200, as also depicted in FIG. 2, has a horizontal top 216, which is substantially parallel with the x-axis 208. The device 200 also is comprised of a front surface 212 and a back surface 214. The front surface 212, in an exemplary embodiment, is a surface for accessing a user-interface ("UI"), such as a display. Additionally, the front surface 212 may be comprised of one or more buttons (either incorporated with the UI as a touch activated display and/or as physical buttons independent of the display). Further yet, it is contemplated that the front surface 212 may be comprised of one or more audio output components (e.g., speaker) and/or one or more audio input components (e.g., microphone).

FIG. 2 depicts the device 200 having a positive z-axis 204 and a negative z-axis 206. The positive z-axis extends from an origin 201 perpendicular to a plane defined by the x-axis 208 and the y-axis 210 on the front surface 212 side of the device 200. Conversely, the negative z-axis extends from the origin 201 perpendicular to the plane defined by the x-axis 208 and the y-axis 210 on the back surface 214 of the device 200. A volume of space extending outward from the plane defined by the x-axis 208 and the y-axis 210 in the positive z-axis 204 direction is referred to herein as positive z-axis space. Similarly, a volume of space extending outward from the plane defined by the x-axis 208 and the y-axis 210 in the negative z-axis 206 direction is referred to herein as negative z-axis space. As a result, a volume of space, such as a spherical area, may extend outwardly from the device to define an area in which a user may interact with the device (e.g., using non-contact gestures and/or using contact gestures).

Generally, a z-axis may be oriented in any orientation and at any location relative to the device 200. For example, as opposed to extending from the front surface 212, a positive z-axis space may alternatively extend from the side 218 or the top 216. To facilitate a consistent discussion hereinafter, the general orientation of the various axes depicted in FIG. 2 will be maintained. However, it is understood that the orientation of the various axes are contemplated in a variety of locations and orientations relative to a device (e.g., device 200) and therefore apply to embodiments of the present invention. As a result, while the term z-axis is used herein, it is understood that a z-axis may represent any axis of the device and therefore it is contemplated detecting a gesture on a first side of the device and on a second side of the device to ultimately detect the gesture in any extended interaction space about the device, which is independent of a particular direction relative of the device.

FIG. 3 depicts a front perspective of a device 300 in accordance with embodiments of present invention. The device 300 may be similar to the device 200 of FIG. 2 discussed above. The device 300 may be comprised of a top edge 302, a left side 304, a right side 306, and a bottom edge 308. While the device 300 is depicted as a substantially rectangular geometry, it is understood that any geometric shape may be implemented. For example, the device 300 may incorporate one or more organic geometries for improved human factors, feel, marketability, and the like. For example, a game controller communicating with a gaming computer console may have a different geometry than a smart phone based, at least on part, on anticipated intended use scenarios of the device (e.g., portability, storage, primary contact of the user).

The device 300 is further comprised of a display 310. The display 310 may display one or more elements of a UI. For example, in a smart phone example, the UI may include one or more graphical elements generated by an operating system of the smart phone. Additionally, it is contemplated that the display 310 is a touch-responsive screen. For example, the display 310 may include one or more touch-based input detection mechanisms to register a user's touch (or other input devices such as a stylus). Examples may include utilizing a capacitive touch screen, a resistive touch screen, and/or the like for detecting a user provided input at the screen. In an additional exemplary embodiment, the display 310 may merely present one or more portions of information without additional functional responsibilities.

In an exemplary embodiments of the present invention, it is contemplated that the display 310 is functional for detecting, at least in part, one or more user gestures in a positive z-axis space (or a negative-z-axis space) of the device 300. For example, the display 310 may detect non-contacting user gestures utilizing a variety of technologies. An exemplary technology may include a controlled refracted optical input mechanism that transfers an image as presented to the display surface (e.g., a user's hand hovering in the positive z-axis space) to one or more edges of the display. This concept may be achieved, in an exemplary embodiment, utilizing "The Wedge" as deployed by the Microsoft Corporation of Redmond, Wash. However, additional technologies are contemplated as well (e.g., capacitive screens that are sensitive to non-touching gestures).

The device 300 is further comprised of one or more gesture sensors. A gesture sensor is a sensing component that is capable, at least in part, to detect a gesture as a user input. Four gesture sensors are depicted on the front surface of the device 300 in FIG. 3. However, it is understood that any number—including none—may be implemented. For example, the gesture sensor may be incorporated into an existing component (e.g., display 310, an audio input device, and audio output device, the device 300 body). The gestures sensors 312, 314, 316, and 318 are depicted as being located proximate the peripheral edges of the device 300. However, it is understood that a gesture sensor may be positioned at any location of the device 300. In an exemplary embodiment, a single gesture sensor may be incorporated into the device 300 for detecting a user gesture in the positive z-axis space. In this example, it is contemplated that the gesture sensor is an optical device, such as a camera. For example, a camera that is capable of capturing still pictures and video, as is traditional for a mobile communication device, may be further adapted to capture user gestures.

Additionally, it is contemplated that the gesture sensor may capture one or more portions of depth information. For example, a depth camera (e.g., a camera used in conjunction with the Kinect available from the Microsoft Corporation of Redmond, Wash.) may be utilized to detect a user gesture as an intended input. Further yet, it is contemplated that a gesture sensor may utilize existing sensing technology (e.g., a camera built into the device). For example, it is contemplated that one or more waveguides may be built into the device to distribute the "pixels" able to be captured by a camera in a pattern that captures a desired space (e.g., a hemispherical volume extending outward from the device in a positive axial and/or a negative axial direction). Because one or more techniques may extend the area captured beyond the intended range of the camera, it is contemplated that time-multiplexing the pixels may be utilized to provide a desired resolution.

Therefore, a gesture sensor may be an optical-based technology (e.g., camera), a capacitive-based technology, a resistance-based technology, a thermal-based technology, an ultrasonic-based technology, a pressure-based technology, and the like. Various combinations of the technologies (and similar technologies) may be implemented in combination. For example, it is contemplated that a proximity sensing technology (e.g., capacitive) may be used for gestures in a first direction of the z-axis and a second technology (e.g., optical) may be utilized in a second direction of the z-axis. Further, it is contemplated that a variety of sensing technologies may be utilized in a common z-axis space (e.g., positive, negative) to detect a gesture as an intended input.

FIG. 4 depicts a rear perspective of the device 300, in accordance with embodiments of the present invention. A negative z-axis space may be depicted as a result of the rear perspective of FIG. 4. A plurality of gesture sensors are depicted in FIG. 4. For example, gesture sensors 402, 404, 406, 408, and 410 are shown. As previously discussed with respect to FIG. 3, the number, position, and orientation of the gesture sensors is merely provided to be exemplary in nature and is not limiting. Therefore, it is contemplated that a gesture sensor may be coupled with the device 300 at any location suitable for sensing a gesture in the negative z-axis space of the device 300. For example, a gesture sensor may be remotely coupled with the device 300, such as an independent sensor of another device (e.g., remote camera, remote sensor). Additionally, as discussed with respect to FIG. 3, it is contemplated that any type of gesture sensor in any combination may be utilized. Further, while the gesture sensors of FIGS. 3 and 4 are depicted as a camera-type sensor, it is contemplated that a gesture sensor may be of any size, shape, and appearance. Consequently, a gesture sensor may not even be a discrete component that is visually identifiable, but instead integrated into one or more components (e.g., existing component, device body) of the device.

A location of the gesture sensor(s) may depend on an anticipated user mode. For example, if a user is anticipated to perform a majority of gestures in the positive and negative z-axis space of the device with a right hand, then a gesture sensor may be positioned in a location that favors detecting a gesture activity towards an edge of the device close to the gesture. However, the orientation (e.g., portrait, landscape) of the device may also be considered when determining a potential location of the gesture sensors on the device.

Gesture sensors may include sensors capable of detecting non-contact gestures, contact gestures, and sensors capable of detecting an internal pose/orientation of the device. For example, non-contact gesture sensors may include cameras utilizing adapted lenses. In an exemplary aspect, the adapted lens may provide a distributed-angle perspective, such as a fish-eye lens.

Additional sensing technology that may be implemented, at least in part, includes proximity infrared sensors, which may be positioned along the edge of the device, for example (proximity IR sensing technology is further discussed in U.S. patent application Ser. No. 11/948,802, the entirety of which is incorporated herein by reference). Additional sensing technologies that may be implemented, at least in part, includes light guides or wedges, as will be discussed in more detail hereinafter. Further, it is contemplated that capacitive sensors capable of detecting non-contact gestures may be implemented. Further, it is contemplated that inaudible by human ears sound sensing using one or more components (e.g., speaker, microphone) of the device may provide proximity sensing as well, in various embodiments.

Figure 5:
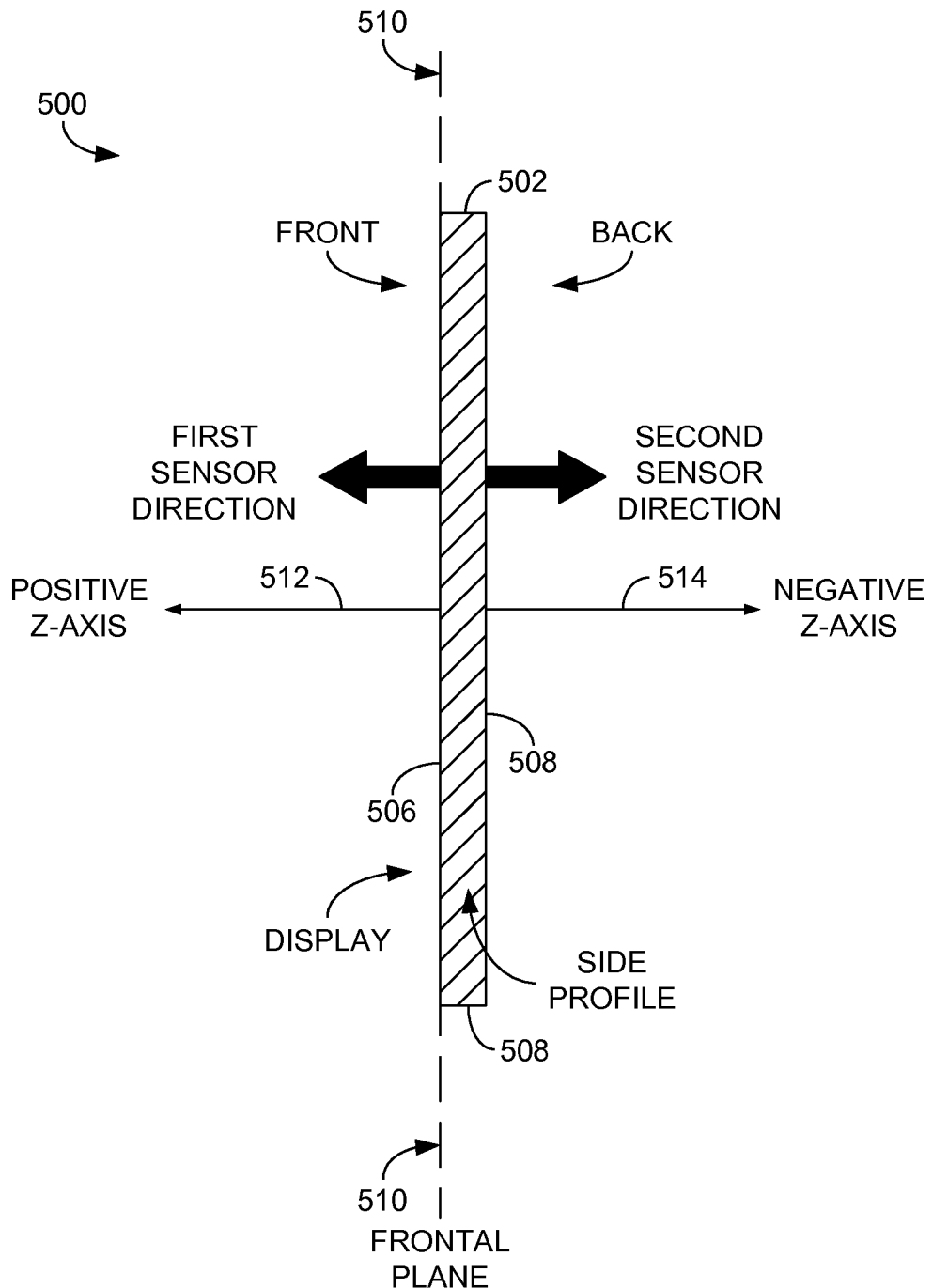
FIG. 5 depicts a side profile of a device, in accordance with embodiments of the present invention.

FIG. 5 depicts a side profile of a device 500, in accordance with embodiments of the present invention. The device 500 is comprised of a top 502, a bottom 504, a front 506, and a back 508. In use, a user typically interacts with the front 506 to view a display of the device 500. The front 506 may define a frontal plane 510 that is coincidental to and parallel with the front 510. A point where an illustrative z-axis intersects the frontal plane 510 provides a reference origin defining where a positive z-axis 512 and a negative z-axis 514 diverge from one another. For example, the positive z-axis space extends away from the device 500 without passing through the back 508, in this example. It is contemplated that the origin, and therefore a point at which the positive and the negative z-axis diverge from one another may be positioned at any point along the z-axis.

In an exemplary embodiment of the present invention, the device 500 is comprised of a first gesture sensor functional for sensing a gesture in the positive z-axis space. Additionally, in an exemplary embodiment of the present invention, the device 500 is comprised of a second gesture sensor functional for sensing a gesture in the negative z-axis space. In an additional exemplary embodiment, the first gesture sensor is not functional for detecting a gesture in the negative z-axis space. Similarly, in an exemplary embodiment, the second gesture sensor is not functional for detecting a gesture in the positive z-axis space. Stated differently, the first gesture sensor and the second gesture sensor must be used in combination to detect a gesture in both the positive z-axis and the negative z-axis space, in this exemplary embodiment.

Figure 6:
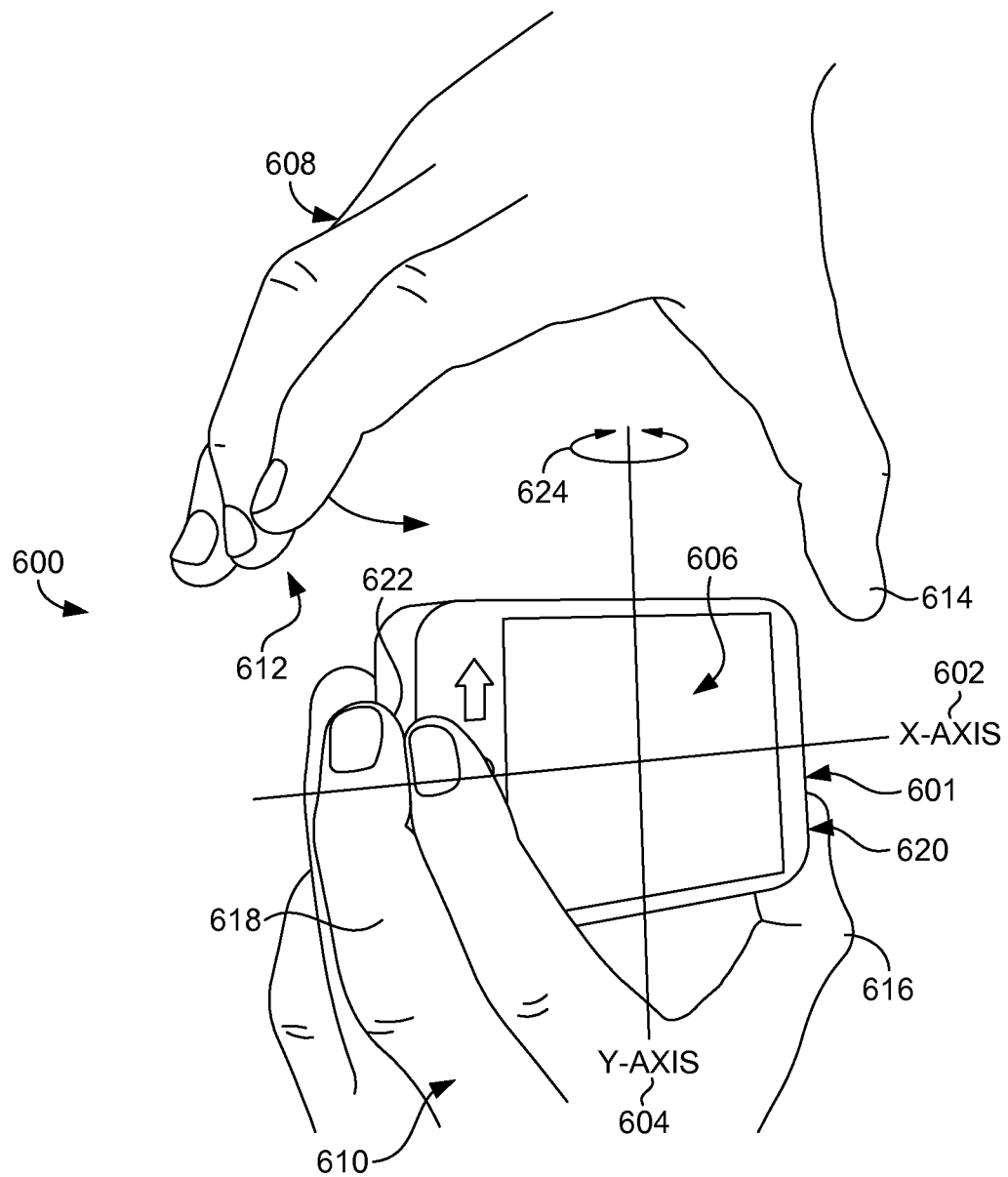
FIGS. 6-10 depict various in-use orientations of a device, in accordance with embodiments of the present invention.

FIG. 6 depicts a device 601 in an in-use orientation 600, in accordance with embodiments of the present invention. FIG. 6 depicts a user manipulating the device 601 with a first hand 608 (e.g., right hand) and a second hand 610 (e.g., left hand). The first hand 608 is depicted rotating about a y-axis 604 of the device 601. For example, a rotational directional indicator 624 is depicted to illustrate a rotational movement performed by the first hand 608 around the y-axis 604. An x-axis 602, which is perpendicular to the y-axis 604, is also depicted horizontally across a display 606 of the device 601.

The first hand 608 is comprised of a first finger 612 and a thumb 614. The second hand is comprised of a first finger 618 and a thumb 616. As depicted in the exemplary orientation of FIG. 6, the second hand 610 is contacting the device 601 along a first side at a first point 622 with the first finger 618 and at a second point 620 with the thumb 616. As will be discussed hereinafter, the device 601 may include one or more contact sensors (or any type of sensor) for detecting a location of contact to help determine an intended gesture, an orientation of the device 601, and/or an anticipated type of gesture. The first hand 608 is oriented above the device 601 with the first finger 612 and the thumb 614 separated from one another and operable for rotating about the y-axis 604 in a twisting-type gesture.

The rotating of the first hand 608 about the y-axis 604 causes portions of the hand (e.g., first finger 612, thumb 614) to transition from a positive z-axis space to a negative z-axis space (and vise versus). For example, the first hand 608 may perform a gesture similar to tightening a lid of a jar such that the center of the "lid" is positioned approximate the y-axis. To accomplish this gesture the first finger 612 and the thumb 614 "grasp" the lid in the positive z-axis space and in the negative z-axis space and begin a rotational gesture to mimic a path the finger/thumb combination would travel if grasping a physical lid.

Alternatively, it is contemplated that the first hand 608 may be held substantially stationary while the second hand 610 rotates the device 601 about the y-axis 604. While one or more gesture sensors may not recognize a difference between the device 601 moving or the first hand 608 moving, other sensing technology may help differentiate. For example, the device 601 may incorporate one or more accelerometers that are capable of detecting if the device 601 is moving or if the first hand 608 is moving to generate the appearance of a rotational movement. Additionally, a gesture sensor itself (in combination with a processor) may also determine if the device 601 or if the first hand 608 is the moving entity. For example, if the gesture sensor is optical, an inference may be made that if background scenery remains substantially constant while a gesture is detected, it may be indicative that the first hand 608 is moving. Alternatively, if the background scenery appears in motion substantially similar to the detected motion, then it may be indicative that the device 601 is being manipulated.

It is contemplated that either hand may be used to maintain the device 601 while the alternative hand may be utilized for providing one or more gestures. Similarly, additional gestures are contemplated with the illustrated exemplary configuration. For example, the first finger 612 and the thumb 614 may perform a pinching-like gesture (e.g., decreasing a distance between the first finger 612 and the thumb 614) that incorporates space both in the positive and in the negative z-axis (e.g., both in front and in back of the device 601).

As previously discussed, the device 601 may incorporate one or more additional sensors. For example, a sensing technology may be utilized to detect a contacting input. A contacting gesture is a gesture that results in the physical contacting of the device and an input mechanism (e.g., stylus, finger). A non-device-contacting gesture is one that does not physically touch the device receiving the input/gesture. For example, a non-device-contacting gesture may be performed by a user at a distance of 1 mm or farther away from a surface of the device, for example. Other distances (greater or smaller) are contemplated as being within a definition of a non-device-contacting gesture. Additional sensors that may be utilized may include accelerometers, magnetometers, gyroscopic sensors, global-positioning systems (e.g., GPS), electro-magnetic sensors, and the like.

Returning to the exemplary aspect that utilizes a third sensor for detecting a contacting input. The third sensor may be any type of sensor discussed previously. For example, a capacitive touch sensor may be integrated into one or more portions of a device such that a location of a contact may be determined. Therefore, when a user contacts the device to hold the device (or to provide an input) the device may be able to determine that a contact gesture has been provided and where it has been provided.

For example, it is contemplated that one or more sensors may be coupled with a device along a perimeter (or sides) of the device (e.g., proximate point 622 and point 620 of FIG. 6). The contact sensor may then identify that the device is being contacted at those location corresponding to one or more sensors. Consequently, an inference may be made as to how a user is oriented relative to the device. For example, when a contact is registered at both the point 622 and 620, a determination may be made that a left hand is grasping the device 601 as the thumb may traditionally contact the device 601 at a lower point along a side relative to where another finger of the same hand may contact the device on an opposite side. Additionally, it is contemplated that a learning algorithm may be introduced to learn how a particular user interacts with a device over time. Further, it is contemplated that one or more additional sensors (e.g., accelerometers, depth cameras, cameras) may also be utilized, alone or in combination, to identify a particular manner in which a user is holding/manipulating a device.

Therefore, when the gesture sensors are combined with one or more contact sensors (and one or more additional sensors of the device such as internal pose/orientation sensors), the device, in an exemplary embodiment, is able to infer when a non-device-contacting gesture that is detected is an intended input. For example, the contact sensors may be a modal selection mechanism to activate an inference that detected gestures by the gesture sensors are intended inputs and not merely detected noise. Similarly, the device, in an exemplary embodiment, is functional for inferring when a contact input is an intended input based on information perceived by gesture sensors (e.g., sensors functional to detect non-device-contacting gestures) and/or additional sensors of the device. In practice, the device utilizes one or more processors when making a determination as to an intention of an input/gesture.

Figure 7:
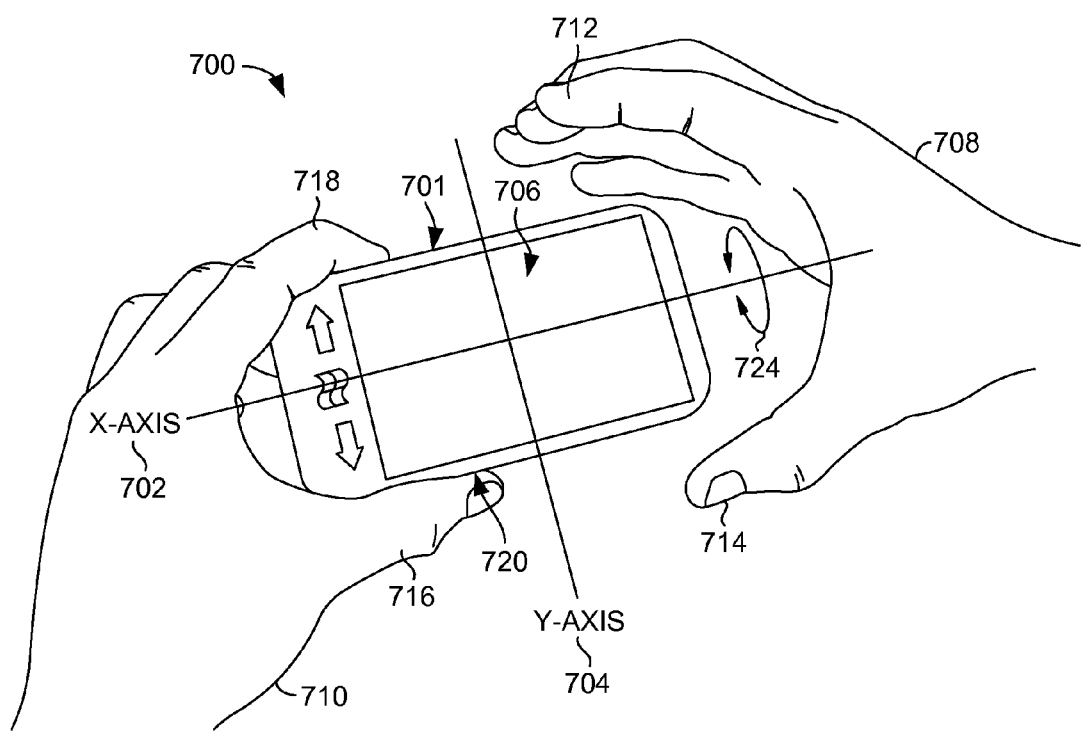

FIG. 7 depicts a device 701 in an in-use orientation 700, in accordance with embodiments of the present invention. FIG. 7 depicts a user manipulating the device 701 with a first hand 708 (e.g., right hand) and a second hand 710 (e.g., left hand). The first hand 708 is depicted rotating about an x-axis 702 of the device 701. For example, a rotational directional indicator 724 is depicted to illustrate a rotational movement performed by the first hand 708 around the x-axis 702. A y-axis 704, which is perpendicular to the x-axis 702, is also depicted vertically across a display 706 of the device 701.

The first hand 708 is comprised of a thumb 714 and a finger 712 that are in the process of performing a non-device-contacting gesture of rotating about the x-axis 702. The rotation of the first hand 708 (and attached thumb 714 and finger 712) crosses both a positive z-axis space (e.g., front side of the device) and a negative z-axis space (e.g., back side of the device). Consequently, a three-dimensional gesture may be captured that crosses both a traditional interactive space in front of the device as well as a space behind the device, which provides the ability for a user to interact with the device in ways not previously available.

The second hand 710, in this example, is contacting the device 701 such that a thumb 716 is contacting the device 701 at a point 720. Additionally, a finger 718 is contacting the device 701 at a point 722. In an exemplary aspect, the device 701 is comprised of a sensor functional to detect a contact at the point 720 and a sensor functional to detect a contact at the point 718. As previously discussed, the detection of a contact at these points may be useable to infer that the second hand 710 is holding the device 701 and that the first hand 708 is operable for providing one or more non-device-contacting gestures. Consequently, the device 701 may infer that detected gestures, such as those by the hand 708 in general, are intended inputs for manipulating one or more aspects of the device 701 (e.g., a UI presented on a display 706).

Additional orientations of the device 701, the first hand 708, the second hand 710 and/or other members (e.g., stylus, pointers) are contemplated. Further, additional sensors, location of sensors, sensing technology, and combinations of the above are contemplated within the scope of the present invention.

As discussed hereinabove, an aspect of the present invention contemplates utilizing non-contact sensors (e.g., depth camera, visible light camera, IR camera, capacitive, ultrasonic, and the like), contact sensors, and/or device pose/orientation sensors (e.g., accelerometers, magnetometers, gyros, GPS, electro-magnetic sensors, and the like) in any combination to identify an orientation, gesture, and/or intent of the device and/or a user. For example, contact sensors, non-contact sensors, and internal pose/orientation sensors may identify what hand of a user is maintaining the device, if the device is moving, if the user is providing a gesture, and/or the like.

Figure 8:
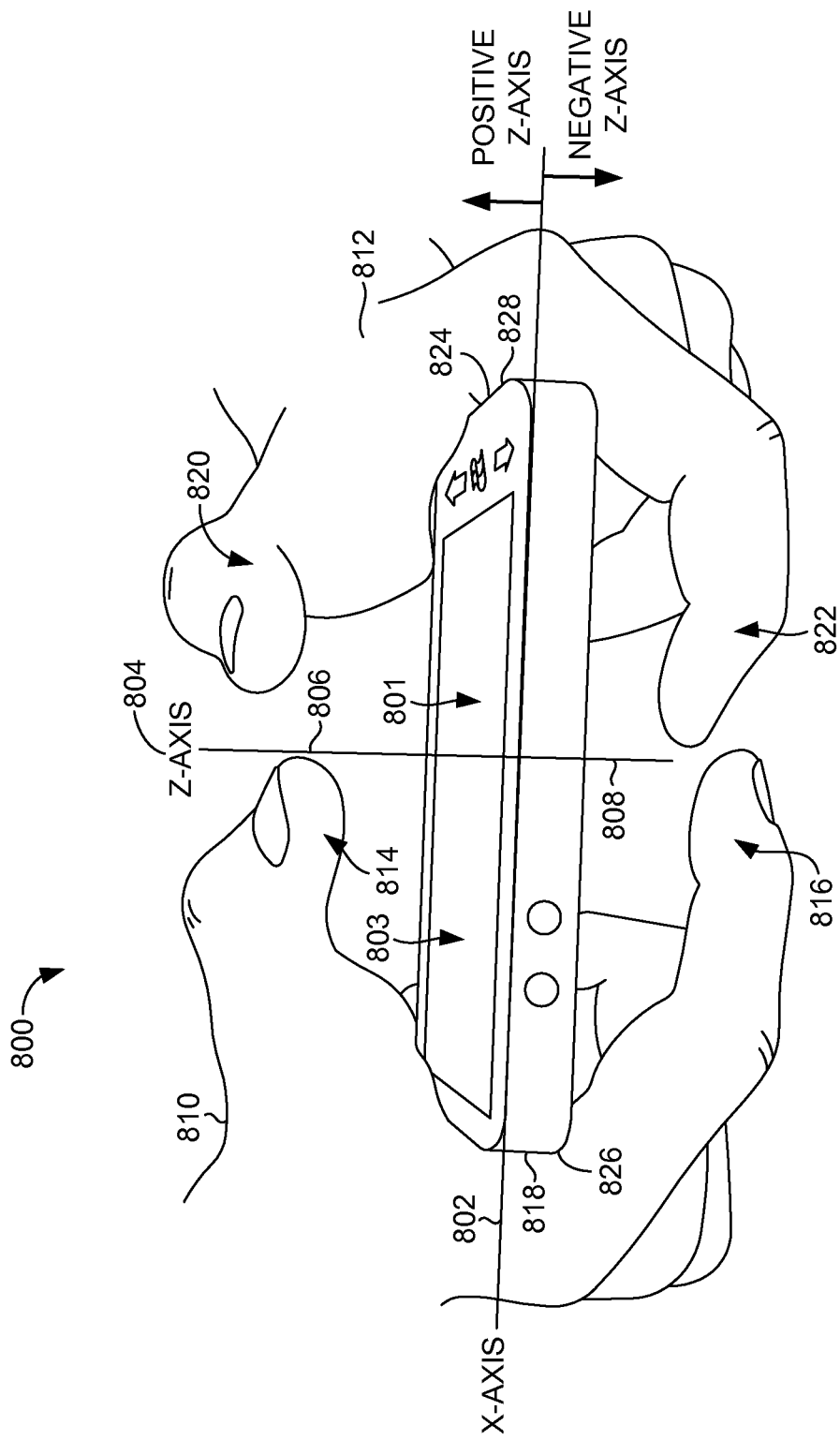

FIG. 8 depicts a device 801 in an in-use orientation 800, in accordance with embodiments of the present invention. FIG. 8 depicts a user manipulating the device 801 with a first hand 810 (e.g., right hand) and a second hand 812 (e.g., left hand). Further, an x-axis is depicted as crossing horizontally along the device 801. A z-axis is depicted as vertically extending perpendicular to the x-axis 802. In general, the user depicted in FIG. 8 is providing various gestures in both a positive z-axis space 806 and a negative z-axis space 808. The various gestures include one or more portions of the first hand 810 and the second hand 812 moving within the positive and the negative z-axis spaces. However, it is contemplated that only one non-device-contacting gesture is performed by one portion of one hand in each of the positive z-axis space and in the negative z-axis space. But, embodiments of the present invention contemplate a variety of gestures occurring at a variety of locations relative to the device 801.

The first hand 810 is positioned such that a thumb 814 is positioned in a positive z-axis space and a finger 816 is positioned in a negative z-axis space. Similarly, a thumb 820 of the second hand 812 is positioned in the positive z-axis space 806 and a finger 822 of the second hand 812 is positioned in the negative z-axis space 808 of the device 801. Further, in this example, a first palm portion 818 is contacting the device 801 at a location 826. A second palm portion 824 is also contacting the device 801; however, the second palm portion 824 is contacting the device 801 at a location 828 on the device 801. In this example, gestures by the thumbs 814 and 820 and the fingers 816 and 822 may be inferred as intended inputs when the device 801 detects contact at positions approximate to 826 and 828, in an example. It is understood that the locations 826 and 828 are exemplary in nature and additional contact areas may be used to provide an inference that one or more non-device-contacting gestures are intended gestures.

Continuing with the exemplary in-use orientation depicted in FIG. 8, a user may manipulate one or more portions of one or more hands in a non-device-contacting gesture in one or both of the positive z-axis space 806 and the negative z-axis space 808. For example, it is contemplated that the thumb 814 and the finger 816 may move in a common direction at a common time. Conversely, it is contemplated that the thumb 814 and the finger 816 may move in different directions during a common time. For example, it is contemplated that the thumb 814 may move towards (i.e., downwardly) the device 801 while the finger 816 simultaneously moves in an opposite direction (i.e., upwardly) that is also towards the device 801. Another example may include the finger 816 moving in a direction substantially parallel to the z-axis 804 while the thumb 814 moves in a plane substantially parallel to a plane defined by a display surface 803 of the device 801. Another example includes pinching a virtual object between the thumb 814 and the finger 816 with the intent of moving the virtual object in an x, y, and/or z-axis direction such that a portion of the virtual object is perceived in the negative z-axis space and another portion of the virtual object is perceived in the positive z-axis space. It is contemplated that any portion of a hand may move in any direction at any time in any portion of the positive and/or negative z-axis spaces.

Similar to the first hand 810, the second hand 812 may manipulate any portion of the positive and/or negative z-axis spaces at any time in any combination. Further, it is contemplated that the first hand 810 and the second hand 812 work in unison. For example, a virtual object that is perceived by a user as being part of both the negative z-axis space and the positive z-axis space may be pinched, stretched, compressed, grasped, and otherwise manipulated by portions of the first hand 810 and/or the second hand 812.

In an exemplary embodiment, it is contemplated that the display 803 is functional for providing a UI that is perceivable by a user as a three-dimensional UI. For example, the display may be partnered with one or more lenses that are positioned between the display 803 and a user's eye(s). The combination of the display and the lenses may provide a three-dimensional perspective, as is known in the art. Other technologies are contemplated for providing a three-dimensional visual experience (e.g., hologram, glasses-free three-dimensional displays, The Wedge with adapted visual output for three-dimensional viewing).

As previously discussed, additional sensors may be used in conjunction with at least a first gesture sensor sensing in the positive z-axis space 806 and at least a second gesture sensor sensing in the negative z-axis space 808. For example, one or more contact sensors coupled with the device 801 to detect a contact at one or more locations (e.g., location 826, location 828, and display 803). Additional sensors that may be used to detect a non-device-contacting gesture and/or aid in determining intent of a detected gesture may include a video camera, a still camera, an accelerometer, and the like.

Further, while FIG. 8 depicts the device 801 positioned between the first hand 810 and the second hand 812 in a lengthwise orientation, it is contemplated that the device 801 may be in any alternative orientation (e.g., widthwise).

Figure 9:
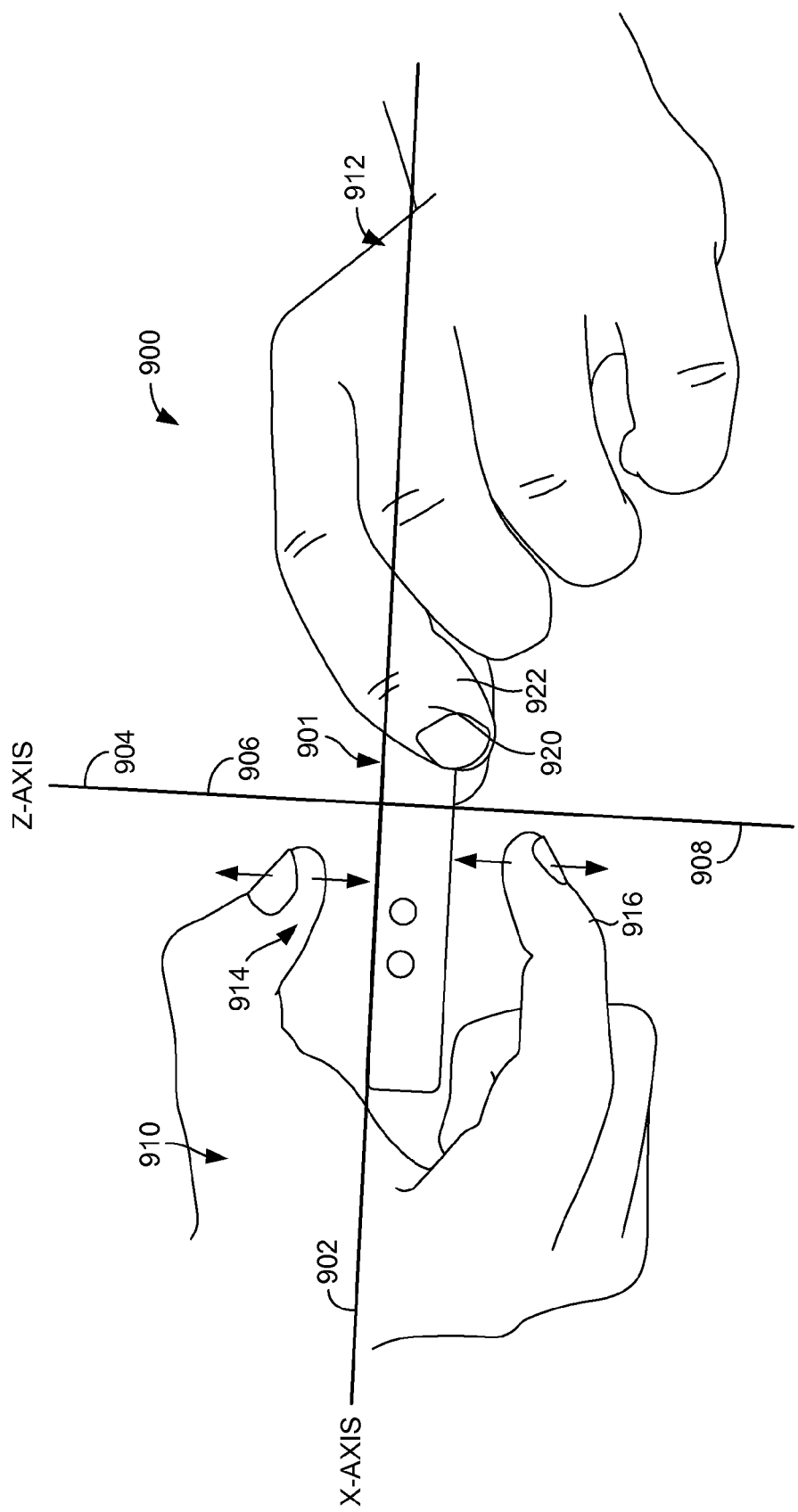

FIG. 9 depicts a device 901 in an in-use side profile orientation 900, in accordance with embodiments of the present invention. FIG. 9 depicts a user manipulating the device 901 with a first hand 910 (e.g., right hand) and a second hand 912 (e.g., left hand). FIG. 9 also depicts an x-axis 902, which is perpendicular to a z-axis 904. The z-axis 904 defines a positive z-axis space 906 that extends from the x-axis upwardly away from the device 901 in the depicted orientation. Similarly, the z-axis 904 is useable to define a negative z-axis space 908 that extends from the x-axis downwardly away from the device 901 in the depicted orientation.

The second hand 912 is depicted as contacting the device 901 while the first hand 910 is depicted as providing one or more non-device-contacting gestures in both the positive z-axis space 906 and the negative z-axis space 908. Again, as previously discussed, the device 901 may be comprised of a first sensor sensing non-device-contacting gestures in the positive z-axis space 906, a second sensor sensing non-device-contacting gestures in the negative z-axis space 908, and a third sensor sensing a finger 922 contacting the device 901 at a location 920. Based on at least the sensing the finger 922 contacting the device 901 at the location 920 (and additional location in conjunction are contemplated), an inference may be made as to how the user is manipulating (e.g., interacting, holding) the device 901. Based on a determination as to how the device 901 is being manipulated, an inference may be generated as to if detected gestures by the first sensor and/or the second sensor are intended gestures to be used as an input.

Various movements of the thumb 914 and the finger 916 are contemplated. For example, as previously discussed they may move in coordination or out of coordination with each other. Similarly, it is contemplated that a first portion of the hand (e.g., thumb, finger) may serve as a modal selector based on a particular gesture, location, or lack of gesture, while a second portion of the hand manipulates an element of a UI.

Figure 10:
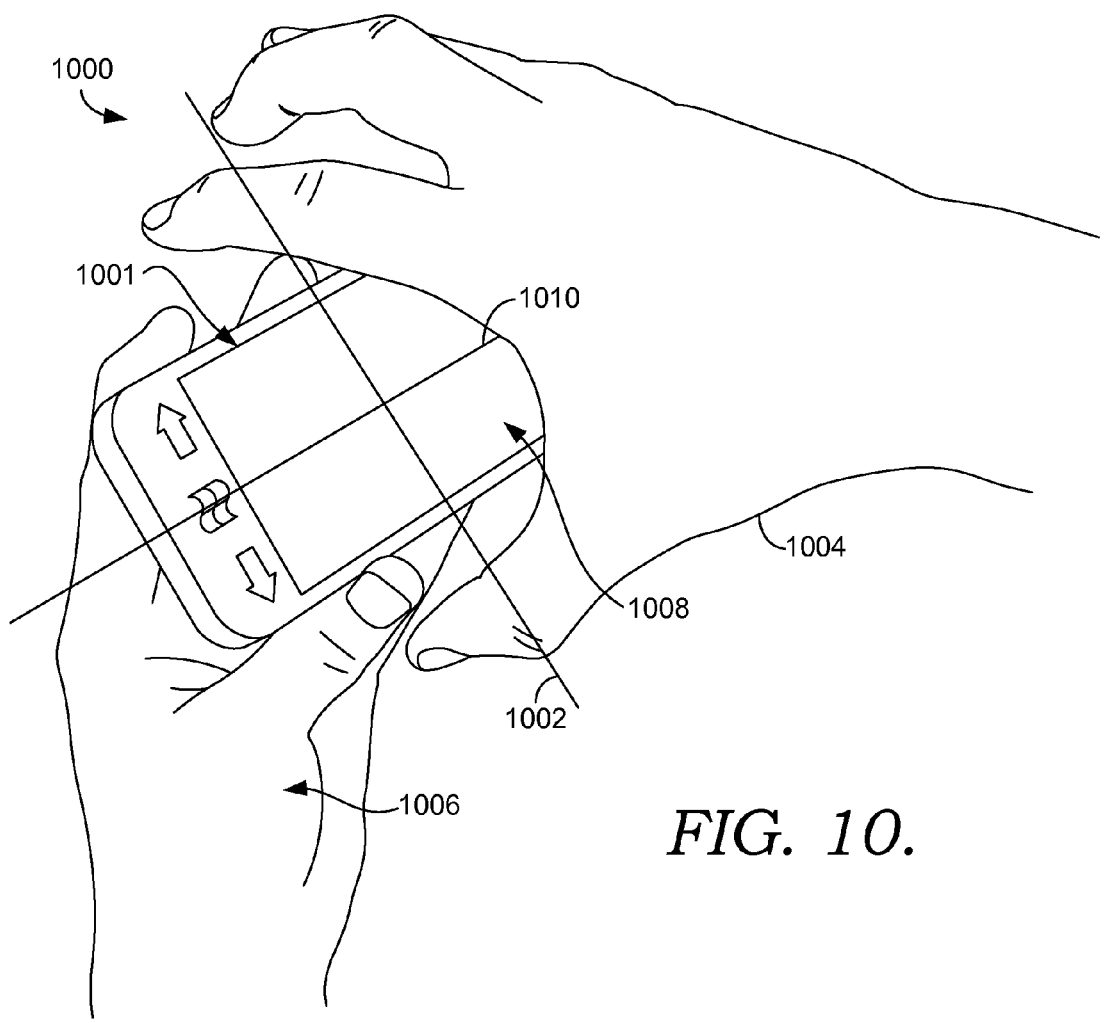

FIG. 10 depicts a device 1001 in an in-use orientation 1000, in accordance with embodiments of the present invention. FIG. 10 depicts a user manipulating the device 1001 with a first hand 1004 (e.g., right hand) covering a display 1002 and a second hand 1006 (e.g., left hand) positioned on the back of the device 1001. An x-axis 1010 and a perpendicular y-axis 1008 are also depicted. A positive z-axis space extends outwardly from the device 1001 towards a palm region of the first hand 1004. A negative z-axis space extends backwardly from the device 1001 towards a palm region of the second hand 1006.

The orientation of FIG. 10 is an exemplary situation depicting the first hand 1004 grasping, without touching, around the device 1001. For example, a first sensor sensing a non-device-contacting gesture in the positive z-axis space of the device

1001 may capture the first hand 1004 closing a z-axis distance between the first hand 1004 and the device 1001. As a result, the device 1001 may anticipate that one or more portions of the first hand 1004 will pass through to the negative z-axis space. Consequently, input from a second non-device-contacting sensor functional for detecting a gesture in the negative z-axis space may be inferred as an intended input. Further, it is contemplated that utilizing both an input detected in the positive z-axis space and an input detected in the negative z-axis space may be used in conjunction to provide a low false positive input and a low false negative input relative to only utilizing input from one of the positive or the negative axial directions.

FIG. 11 illustrates a block diagram depicting a method 1100 for detecting user input in both a positive z-axis space and a negative z-axis space of a device, in accordance with embodiments of the present invention. At a block 1102, a first sensor is utilized to sense a non-device-contacting gesture in a positive z-axis space. For example, it is contemplated that one or more sensors capable of detecting a gesture in the positive z-axis space of a device are coupled with the device, such as integrated cameras. The detection of a gesture by the first sensor may then be interpreted as an input for the device. As previously discussed, a non-device-contacting gesture may include a hand gesture that is done in a volume of space beyond the device, such that the hand gesture does not contact the actual device to provide the input.

At a block 1104, a second sensor is utilized to detect a second input that is in a negative z-axis space of the device. In an exemplary embodiment, the second input is a non-device-contacting gesture. However, it is contemplated that the second input may be a contacting gesture that is useable by the device to infer that the first input is an intended input. Further, it is contemplated that the first input and the second input result from a continuous gesture, such as a rotation of a hand about an x-axis or a y-axis (or any line that results in an input in both the positive and the negative z-axis space). Another example of a uniform gesture that produces the first input and the second input includes those gestures discussed with respect to FIGS. 6-10 previously.

In an exemplary embodiment, the first sensor is only effective for sensing an input in the positive z-axis space. Similarly, in an exemplary embodiment, the second sensor is only effective for sensing an input in the negative z-axis space. For example, a camera coupled with a device such that the camera aperture is in a plane substantially parallel with a front surface of a device may not be able to detect an input on the back side of the device with the described configuration. Therefore, a second sensor may be utilized to capture a gesture that occurs in the negative z-axis space.

At a block 1106, a UI is updated in response to the first sensor sensing/detecting a gesture/input in the positive z-axis space and in response to the second sensor sensing/detecting a gesture/input in the negative z-axis space. For example, the updating of a UI may include refreshing an image as presented by the UI to reflect a change in one or more objects based on the first input and/or the second input. The updating of the UI may require both the first input from the positive z-axis and the second input from the negative z-axis to be sensed to be completed.

As previously discussed, it is contemplated that an additional step of the method 1100 may include detecting a third input. The third input may be detected with a third sensor. The third sensor may be functional for sensing touch (e.g., capacitive technology based). For example, the third sensor may detect a second hand holding the device and the first and second sensors may detect non-device-contacting gestures occurring in the positive and negative z-axis spaces of the device. Therefore, in an exemplary embodiment, a processor is utilized to determine that the first input and the second input are intended inputs based on the third sensor detecting the third input. Further yet, it is contemplated that the third sensor is capable of detecting multiple inputs, such as a multi-touch display. Therefore, the third sensor may detect a fourth input, such as a contact by the other hand. In this example, the device may detect the third input and the fourth input to be contacting inputs implying the device is being held by one or more hands, and the first and second inputs may then be inferred as intentional inputs from a three-dimensional gesture.

It is contemplated that additional steps may be performed in connection with the method 1100. Additionally, it is contemplated that one or more steps (as indicated by the blocks or not illustrated in FIG. 11) may be performed in any order and sequence.

FIG. 12 illustrates a block diagram of an exemplary method 1200 for detecting user input in both a positive z-axis space and a negative z-axis space of a device, in accordance with embodiments of the present invention. A block 1202 depicts a step of detecting a non-device-contacting user gesture in a positive z-axis space of a device utilizing a first optical-based sensor. For example, it is contemplated that a camera, such as a depth camera, is functional to detect a user's hand gesture that occurs in the front of a device, such as between a display and the user.

At a block 1204, a step is depicted for detecting the same non-device-contacting gesture in a negative z-axis space of the device with a second optical-based sensor. For example, the same gesture that is performed in both the positive and the negative z-axis space may include any of those gestures discussed with respect to FIGS. 6-10 previously (e.g., pinching, rotating). For example, a gesture that is performed by a single hand of a user as if the gesture is manipulating a virtual object is an example of a common gesture that occurs in both a positive z-axis space and a negative z-axis space.

At a block 1206, a step is depicted for determining the non-device-contacting gesture detected with the first and the second optical-based sensors are a first input to the device. For example, the combination of movements in the positive z-axis space along with movements in the negative z-axis space may be interpreted as a common (but yet potentially complex) input. The input may be intended to manipulate an object presented by a display of the device or even an external display (e.g., television, monitor). Further, it is contemplated that a determination is performed that the combination of the first gesture and the second gesture of the have a high probability of being an intended input. Such a determination may be made through a learning process, addition of a third input, and the like.

A block 1208 depicts a step for adjusting a UI on a display in response to determining the non-device-contacting gesture in the positive z-axis space and in the negative z-axis space is the first input. For example, the device may be a video game controller that is manipulated by a user to affect one or more objects displayed by an external display. Based on the first input (e.g., a rotation, a pinching, an elongating gesture), an object of the UI may be manipulated with an appropriate transformation (e.g., rotating the object, compressing the object, stretching the object). In an additional exemplary embodiment, it is contemplated that a UI is presented as part of the device itself, such as with a mobile communications device (e.g., mobile phone). Therefore, the manipulation of the presented object with three-dimensional non-device-contacting gestures may allow for the object to be adjusted in response to the input.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method in a computing environment utilizing a processor and memory for detecting user input in both a positive z-axis space and a negative z-axis space of a device, the method comprising:

utilizing a first sensor of the device sensing first movement in a z-axis in the positive z-axis space of the device to detect a first input, wherein the first input is a non-device-contacting gesture, the positive z-axis space extending in the z-axis perpendicular to a first plane defined by an x-axis and a y-axis over a first surface of the device, the first surface comprising a display of the device;

utilizing a second sensor of the device sensing second movement in the z-axis in the negative z-axis space of the device to detect a second input, the negative z-axis space extending in the z-axis perpendicular to a second plane defined by the x-axis and the y-axis over a second surface of the device that is opposite the first surface; and updating a user interface presented on the display of the device in response to determining a relative position of the first input in the positive z-axis space and the second input in the negative z-axis space along the z-axis, the first and second movements both being non-device contacting, the updating requiring at least both the first input from the positive z-axis space and the second input from the negative z-axis space to be sensed to be completed, wherein the first input and the second input result from a rotational gesture approximately about an axis substantially parallel with at least one of the x-axis and the y-axis.

2. The method of claim 1, wherein the positive z-axis space extends from a z-axis origin located at a frontal plane of the device towards a location of a user of the device.

3. The method of claim 1, wherein the second input is a non-device-contacting gesture.

4. The method of claim 1, wherein the first sensor is only effective for sensing an input in the positive z-axis space and the second sensor is only effective for sensing an input in the negative z-axis space.

5. The method of claim 1, wherein the positive z-axis space and the negative z-axis space are different spaces.

6. The method of claim 1, wherein the first input and the second input is a common gesture that is provided in both the positive z-axis space and the negative z-axis space.

7. The method of claim 1, wherein the first input and the second input result from a rotational gesture approximately about an axis substantially parallel with a y-axis of the device.

8. The method of claim 1, wherein the first input and the second input result from a rotational gesture approximately about an axis substantially parallel with an x-axis of the device.

9. The method of claim 1 further comprising utilizing a third sensor sensing a third input, wherein sensing the third input allows for an inference that inputs received by the first sensor or the second sensor are intended inputs.

10. The method of claim 9, wherein the third sensor is a touch-activated sensor.

11. The method of claim 9, wherein the third sensor is able to be activated by a first hand of the user while the first sensor and the second sensor are able to sense a second hand of the user.

12. The method of claim 9, wherein the third sensor detects a fourth input, wherein the fourth input allows for an inference that the first input and the second input are unintentional inputs.

13. A device for detecting user input in both a positive z-axis space and a negative z-axis space of the device, the device comprising:

a device body having a front side and an opposite back side, wherein the front side is oriented toward the positive z-axis space and the back side is oriented toward the negative z-axis space;

a first sensor coupled with the device body for sensing first movement of a non-device-contacting user gesture in a z-axis in the positive z-axis space of the device, the positive z-axis space extending in the z-axis perpendicular to a first plane defined by an x-axis and a y-axis over a first surface of the device, the first surface comprising a display;

a second sensor coupled with the device body for sensing second movement of the non-device-contacting user gesture in the z-axis in the negative z-axis space of the device, the negative z-axis space extending in the z-axis perpendicular to a second plane defined by the x-axis and the y-axis over a second surface of the device that is opposite the first surface; and a processor coupled with the device body for processing a first input from the first sensor sensing the first movement in the positive z-axis space of the device, for processing a second input from the second sensor sensing the second movement in the negative z-axis space of the device, and for identifying an instance of the non-device-contacting user gesture based on determining a relative position of the first input and the second input along the z-axis, wherein the first input and the second input result from a rotational gesture approximately about an axis substantially parallel with at least one of an x-axis of the device and a y-axis of the device.

14. The device of claim 13, wherein the first sensor is comprised of a camera.

15. The device of claim 13, wherein the first sensor is comprised of a proximity sensor.

16. The device of claim 13, wherein the first sensor and the second sensor utilize a similar sensing technology.

17. The device of claim 13 further comprising a third sensor coupled to the device body for sensing a touch-based user input.

18. The device of claim 13, wherein the display comprises a display for displaying a user interface, wherein the user interface is updatable in response to sensing the non-device-contacting user gesture by the first sensor and the second sensor.

19. One or more computer storage devices having computer-executable instructions embodied thereon, that when executed by a computing system having a processor and memory, cause the computing system to perform a method, the method comprising:
  detecting first movement in a z-axis in a positive z-axis space of the device utilizing a first depth camera, the positive z-axis space extending perpendicular to a first plane defined by an x-axis and a y-axis over a first surface of the device, the first surface comprising a display;
  detecting second movement in the z-axis in a negative z-axis space of the device utilizing a second depth camera, the negative z-axis space extending in the z-axis perpendicular to a second plane defined by the x-axis and the y-axis over a second surface of the device that is opposite the first surface, the first and second movements being part of a non-device-contacting grasping user gesture comprising a first finger in the negative z-axis space and a second finger in the positive z-axis space;
  identifying, with a processor, an instance of the non-device-contacting grasping user gesture based on determining the adjustment occurred using the detected first and second movements; and
  adjusting a user interface on the display in response to the identifying the instance of the non-device-contacting grasping user gesture,
  wherein the first movement and the second movement result from a rotational gesture approximately about an axis substantially parallel with at least one of an x-axis of the device and a y-axis of the device.

20. The one or more computer storage devices having computer-executable instructions embodied thereon of claim 19, the method further comprising utilizing a third sensor sensing a third input, wherein sensing the third input allows for an inference that movements detected by the first sensor or the second sensor are intended inputs.

* * * * *